Oct. 24, 1933.                  G. L. CHERRY                      1,931,860
                         MATERIAL HANDLING APPARATUS
                         Filed Oct. 9, 1928           2 Sheets-Sheet 1
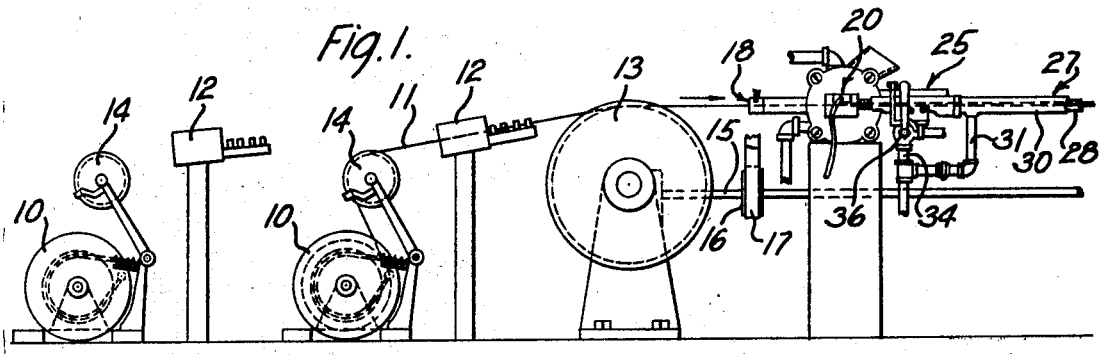
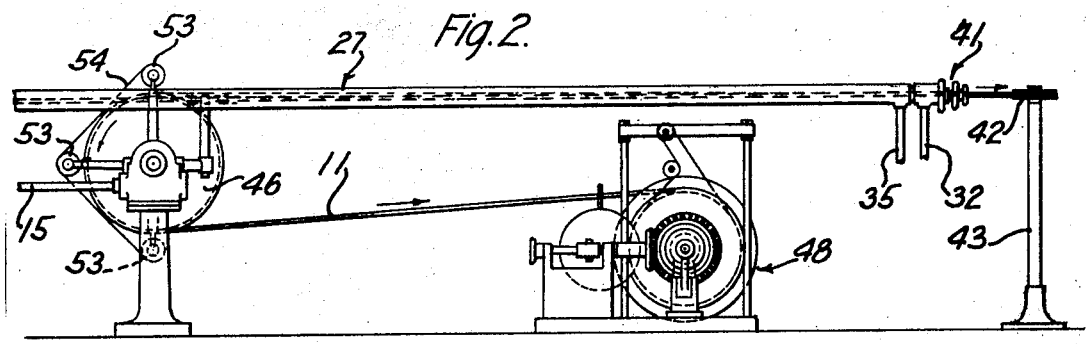
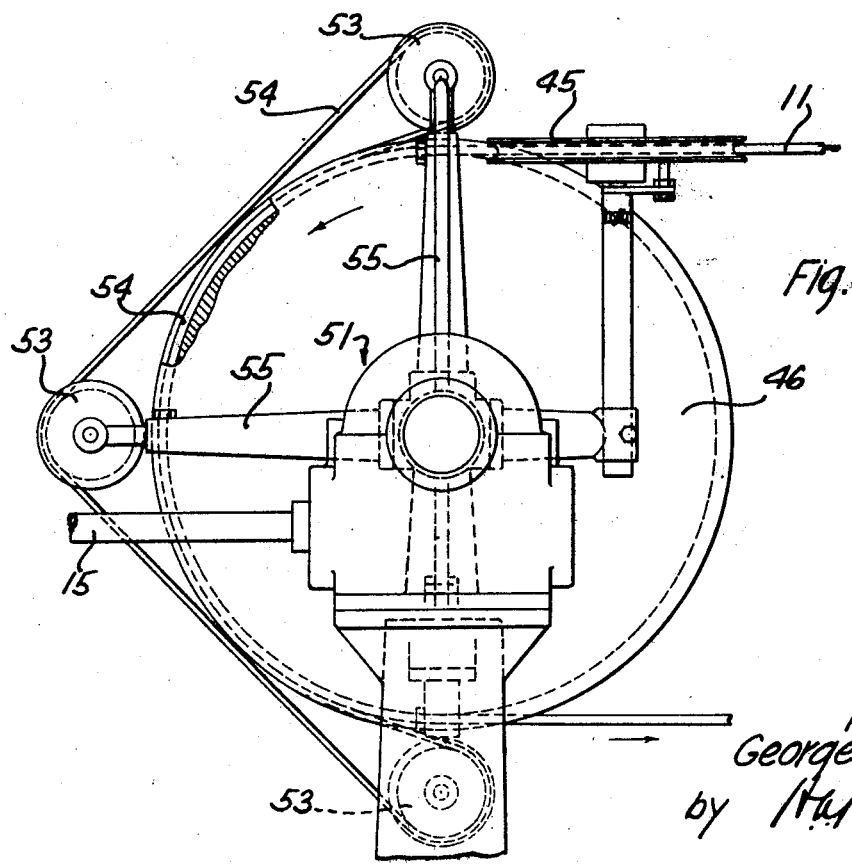
Inventor
George L. Cherry
by Oct. 24, 1933.     G. L. CHERRY     1,931,860
MATERIAL HANDLING APPARATUS
Filed Oct. 9, 1928     2 Sheets-Sheet 2
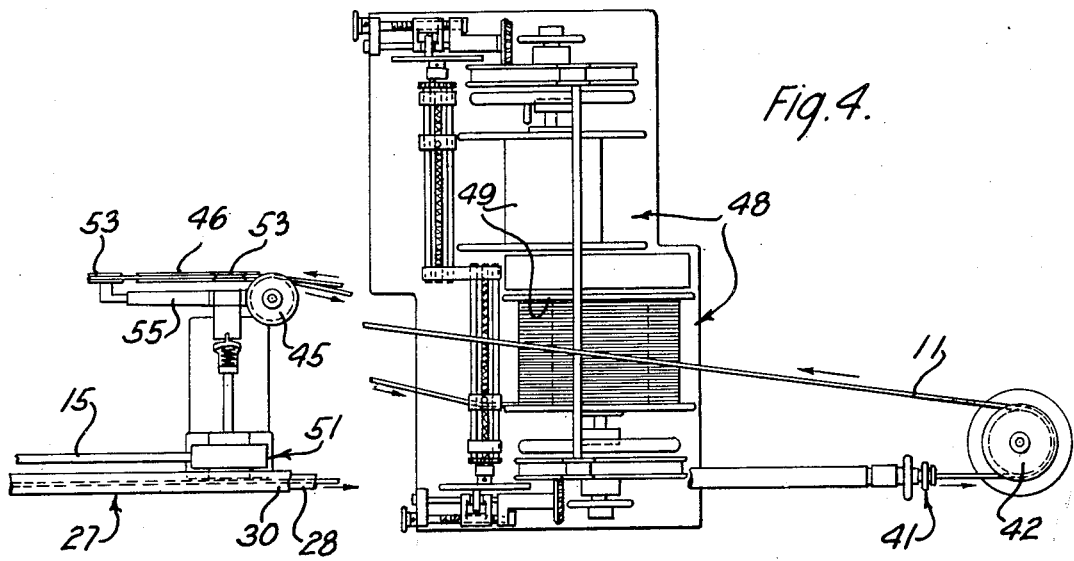
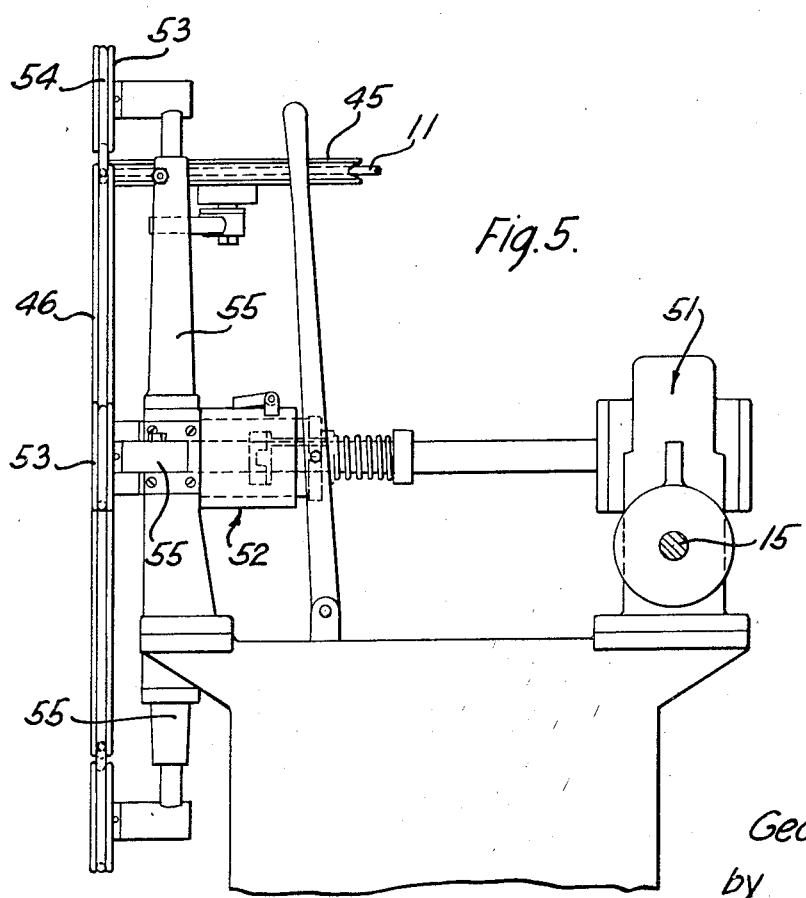
Inventor
George L. Cherry
by /s/ Hafattern. Att'y.

Patented Oct. 24, 1933

1,931,860

UNITED STATES PATENT OFFICE 1,931,860

MATERIAL HANDLING APPARATUS

George Lafayette Cherry, La Grange, Ill., assignor to Western Electric Company, Incorporated, New York, N. Y., a corporation of New York Application October 9, 1928. Serial No. 311,298

2 Claims. (Cl. 254—176)

This invention relates to material handling apparatus, and more particularly to apparatus for handling continuous lengths of material, such as insulated electrical conductors.

In certain types of material handling apparatus, material to be conveyed is passed over a power driven advancing member, such as a capstan, which so long as the conveyed material is maintained under tension will tend to advance the material. However, such apparatus is often subject to the disadvantage that if the material being conveyed is not maintained under tension the material will not remain in close contact with the advancing member and accordingly the material will not be continuously advanced. It is particularly desirable in continuous extrusion and vulcanizing apparatus such as that disclosed in the patent to L. F. Lamplough No. 1,689,205 dated October 30, 1928, to have the material being treated conveyed through the apparatus continuously and the apparatus comprising the present invention is particularly useful for treating and handling insulated electrical conductors.

The object of the present invention is to provide material handling apparatus by means of which material may be continuously advanced regardless of whether the material to be advanced is maintained under tension.

In accordance with the general features of the invention as embodied in one specific form thereof, a core of material to be treated, such as a wire or cable, is passed from a supply reel through a mechanism provided with an extrusion head through which the strand passes, which applies a coating of unvulcanized insulating material upon the advancement of the strand. Connected to the extrusion mechanism is a vulcanizing chamber into which the coated strand passes directly without access to the atmosphere and in which the insulated material is subjected to sufficient heat and pressure to vulcanize it. The strand, now covered with a vulcanized insulating coating, emerges from the vulcanizing chamber through a seal which tends to maintain the pressure within the chamber and passes over a material advancing member designed to advance the insulated wire through the aforementioned members. A yieldable companion material engaging means is provided adjacent the material advancing means in such a position that the insulated wire passes between the advancing member and the material engaging means and is maintained in contact with the advancing member so as to be continuously advanced thereby even when there is no tension upon the material. The insulated wire as it passes from the material advancing means is wound upon a storage reel where it may remain until used.

Other objects and features of the invention will be apparent from the following detailed description of a specific embodiment thereof, taken in connection with the accompanying drawings illustrating an embodiment thereof, and in which Figs. 1 and 2 with Fig. 2 arranged to the right of Fig. 1 show a side elevation of a wire insulating machine embodying the invention;

Fig. 3 is an enlarged side elevation of a material handling means forming a part of the apparatus;

Fig. 4 is a fragmentary plan view of the wire insulating apparatus, and

Fig. 5 is an enlarged end elevation of the material handling means.

Referring now to the drawings, wherein like reference numerals designate like parts throughout the several views, one embodiment of the invention is illustrated which is designed to cover an electric wire with an insulating coating of rubber. The apparatus embodying the invention is provided with supply reels 10—10 having tensioning means 14—14 adjacent thereto, from one of which reels a wire 11, which is to be covered, is drawn through a wire straightening device 12 of any desired form by means of a capstan 13 around which the wire passes, which capstan is driven through a shaft 15 at a peripheral speed slightly greater than that of the wire in order to relieve tension on the wire during its passage through the members described hereinafter. The shaft 15 is rotated by means of a pulley 16 connected to a source of power (not shown) through a belt 17. From the capstan 13 the wire passes through a combined wiping and tensioning means 18 which cleans the wire and tends to maintain a uniform tension thereon and then the wire passes through an extrusion mechanism designated generally by the numeral 20, which is designed to extrude a uniform coating of unvulcanized insulating material on the wire as it emerges therefrom. The extrusion mechanism may be of any well known type and is illustrated only diagrammatically since a complete description of its construction is not essential to an understanding of the present invention. It suffices to say that it is provided with a conveying screw which forces the insulating material under high pressure through a die around the wire as it passes through an extrusion head which may be of any suitable type such as that described in the patent to R. C. Kivley No. 1,770,985, dated July 22, 1930.

A connecting member 25, such as that described in the patent to R. C. Kivley No. 1,788,527, dated January 13, 1931, effects a pressure-tight connection between the extrusion mechanism 20 and a vulcanizing chamber 27 which comprises an inner elongated tubular member 28 through which the wire is conveyed and an outer tubular member 30 encircling the inner member 28 so as to form a jacket therearound. The inner tubular member 28 is provided with an inlet pipe 34 and three-way valve 36, and an outlet pipe 32 for conveying a heated non-oxidizing vulcanizing medium, such as steam, under pressure into and out of the chamber, and the outer tubular member 30 is also supplied with similar inlet and outlet pipes 31 and 35 for conveying steam continuously into and out of the space between the tubular members 28 and 30.

The insulated wire passes through the connecting member 25 and the vulcanizing chamber 27 and emerges from the latter through a seal 41, such as that disclosed in the aforementioned patent to L. F. Lamplough, which prevents the escape of more than a predetermined amount of the vulcanizing medium from the interior of the chamber.

From the seal 41 the wire, now covered with a vulcanized insulating coating, passes around a sheave 42 rotatably supported upon a standard 43 and thence around a sheave 45 (Figs. 3, 4 and 5) mounted adjacent a capstan 46 designed to advance the wire through the extrusion mechanism and the vulcanizing chamber. The sheave 45 is so positioned that as the wire passes thereover it may contact with the capstan 46 substantially tangent to the periphery thereof and may be passed around the capstan to one of a plurality of take-up mechanisms 48—48, of any well known type, which serve to wind the insulated wire upon take-up reels 49—49. The capstan 46 is driven through the shaft 15 by means of a gear train designated generally by the numeral 51 and is provided with a clutch mechanism 52 by means of which the capstan 46 may be connected or disconnected from the source of power.

Mounted closely adjacent the capstan 46 are a plurality of sheaves 53—53, around which is threaded an endless belt 54 in such a position that the belt may contact with the insulated wire passing over the capstan and maintain the same in intimate contact with a considerable portion of the periphery of the capstan in order that the capstan may continuously advance the insulated wire regardless of whether the wire is being withdrawn therefrom by means of the take-up mechanism or whether the wire is merely piling upon the floor adjacent the capstan. As is clearly shown in Figs. 3 and 5, the sheaves 53—53 are rotatably mounted on arms 55—55 in such positions that two of the sheaves 53—53 are diametrically opposed and the third of which is positioned at a point substantially intermediate the other two sheaves, thereby permitting the belt 54 to pass around the capstan 46 over substantially one-half of the periphery of the capstan.

The operation of the device is as follows: The end of the uncovered wire 11 is threaded through the wire straightening device 12 around the capstan 13, through the wiping and tensioning means 18, through the extrusion mechanism 20, through the vulcanizing chamber 27 and the seal 41, around the sheaves 42 and 45, around the capstan 46 and beneath the endless belt 54, and on to one of the reels 49—49, upon one of the take-up mechanisms 48—48. Power is then applied to the various driven members and a quantity of unvulcanized insulating material, such as a rubber compound, is inserted into the extrusion mechanism, which forms a compact uniform sheathing of the unvulcanized material around the wire 11. Steam is then introduced into the inner tubular member 28, steam as noted above being continuously circulated in tubular member 30 comprising the vulcanizing chamber 27, through the pipes 31 and 34, whereupon the vulcanizing process begins, the steam within the outer tubular member 30 serving as a heat insulating medium which maintains the temperature within the inner tubular member 28 substantially constant. The coated wire continues through the vulcanizing chamber 27, throughout which it is subjected to a vulcanizing temperature and pressure, and by the time the wire emerges through the seal 41, the insulating material is vulcanized to the desired degree.

In the operation of the apparatus the supply reels 49—49 are filled with the insulated wire more rapidly than the supply reels 10—10 are exhausted because of the increased diameter of the insulated wire over that of the uninsulated wire and in consequence it is necessary to sever the insulated strand when one take-up reel has been filled and to connect the severed end to an unfilled reel while the mechanism is in operation. However, should there be a momentary slowing down of the wires passing through the apparatus, a ball of the insulating compound may be formed on the wire at the extrusion mechanism, and if this occurs the insulation may be stripped from the wire as it passes through the seal 41, since the seal is adjusted to accommodate wire only of the desired size or very slightly larger wire, which would necessarily result in a shut-down of the apparatus. In order to insure the continuous withdrawal of the insulated wire from the vulcanizing chamber even during the periods when the take-up mechanism is not operating and the wire is being connected to an unfilled take-up reel, the capstan 46 and the associated sheaves 53—53 and endless belt 54 are provided. Under ordinary circumstances when there is no tension exerted upon the wire passing around the capstan 46, the capstan would not exert its full power upon the wire and in consequence the wire would not be continuously advanced. However, in the present apparatus the wire is maintained in contact with a considerable portion of the periphery of the capstan 46 by means of the endless belt 54 and the capstan is thereby enabled to exert its full power upon the insulated wire even when there is no tension exerted upon the free end of the wire.

It will thus be seen that the applicant has furnished a simple and effective means for insuring the continuous advancement of materials regardless of whether or not the material to be advanced is maintained under tension. It is to be understood, however, that the embodiment of the invention described herein is only a useful form of the invention and that the invention may be embodied in numerous forms falling within the scope of the annexed claims.

What is claimed is:

1. In a machine for treating strands having means to supply a strand substantially continuously to the machine and means to subject the strand to a continuous process of treatment, the combination with a capstan to draw the strand continuously through the machine and an intermittent take-up device to receive the finished strand, of a belt running against the strand on the peripheral surface of the capstan and holding the strand in driving contact therewith over the whole of a continuous arc of the periphery thereof.

2. In a machine for treating strands having means to supply a strand substantially continuously to the machine and means to subject the strand to a continuous process of treatment, the combination with a capstan to draw the strand continuously through the machine and interchangeable take-up reels to receive the finished strand, of an idler belt running against the strand on the peripheral surface of the capstan and holding the strand in driving contact therewith over the whole of a continuous arc of the periphery thereof.

GEORGE LAFAYETTE CHERRY.